(12) United States Patent
Kolluru et al.

(10) Patent No.: US 10,222,509 B2
(45) Date of Patent: Mar. 5, 2019

(54) SILICONE HYDROGEL LENS WITH A CROSSLINKED HYDROPHILIC COATING

(71) Applicant: Novartis AG, Basel (CH)

(72) Inventors: Chandana Kolluru, Suwanee, GA (US); Bradley Quinter, Duluth, GA (US)

(73) Assignee: Novartis AG, Basel (CH)

( * ) Notice: Subject to any disclaimer, the term of this patent is extended or adjusted under 35 U.S.C. 154(b) by 266 days.

(21) Appl. No.: 15/333,214

(22) Filed: Oct. 25, 2016

(65) Prior Publication Data

US 2017/0038501 A1 Feb. 9, 2017

Related U.S. Application Data

(62) Division of application No. 13/675,805, filed on Nov. 13, 2012, now Pat. No. 9,505,184.

(60) Provisional application No. 61/560,103, filed on Nov. 15, 2011.

(51) Int. Cl.

| G02B 1/04 | (2006.01) |
|---|---|
| B29D 11/00 | (2006.01) |
| B65B 5/04 | (2006.01) |
| G02C 7/04 | (2006.01) |
| B29C 35/08 | (2006.01) |
| B29K 83/00 | (2006.01) |
| B29K 105/00 | (2006.01) |

(52) U.S. Cl.
CPC ........ *G02B 1/043* (2013.01); *B29D 11/00038* (2013.01); *B29D 11/00865* (2013.01); *B65B 5/04* (2013.01); *G02C 7/049* (2013.01); *B29C 35/0805* (2013.01); *B29C 2035/0827* (2013.01); *B29D 11/00134* (2013.01); *B29K 2083/00* (2013.01); *B29K 2105/0061* (2013.01); *B29K 2833/12* (2013.01); *B29K 2909/08* (2013.01); *B29K 2995/0027* (2013.01); *B29K 2995/0092* (2013.01); *G02C 2202/16* (2013.01)

(58) Field of Classification Search
CPC ... G02B 1/043; G02C 7/049; B29C 11/00038; B29D 11/00865; B65B 5/04
See application file for complete search history.

(56) References Cited

U.S. PATENT DOCUMENTS

| 5,010,155 | A | 4/1991 | Mueller |
|---|---|---|---|
| 2009/0168012 | A1 | 7/2009 | Linhardt et al. |
| 2009/0169716 | A1 | 7/2009 | Linhardt et al. |
| 2009/0171027 | A1 | 7/2009 | Linhardt et al. |
| 2009/0171049 | A1 | 7/2009 | Linhardt et al. |
| 2009/0171050 | A1 | 7/2009 | Linhardt et al. |
| 2009/0171459 | A1 | 7/2009 | Linhardt et al. |
| 2009/0220607 | A1 | 9/2009 | Kiser et al. |
| 2012/0314185 | A1* | 12/2012 | Bauman ......... G02B 1/043 351/159.33 |

FOREIGN PATENT DOCUMENTS

| JP | 2004131566 A | 4/2004 |
|---|---|---|
| WO | 93/00391 A1 | 1/1993 |

* cited by examiner

*Primary Examiner* — Mathieu D Vargot
(74) *Attorney, Agent, or Firm* — Jian Zhou

(57) ABSTRACT

The invention is related to a cost-effective method for making a silicone hydrogel contact lens having a crosslinked hydrophilic coating thereon. A method of the invention involves autoclaving, in a sealed lens package, a silicone hydrogel contact lens having a base coating of polyacrylic acid thereon in an aqueous solution in the presence of a water-soluble, crosslinkable hydrophilic polymeric material having epoxide groups, for a period of time sufficient to covalently attach the crosslinkable hydrophilic polymeric material onto the surface of the silicone hydrogel contact lens through covalent linkages each formed between one epoxide group and one of the carboxyl groups on and/or near the surface of the silicone hydrogel contact lens.

20 Claims, No Drawings

SILICONE HYDROGEL LENS WITH A CROSSLINKED HYDROPHILIC COATING

This application is a division of application Ser. No. 13/675,805 filed 13 Nov. 2012, now U.S. Pat. No. 9,505,184, which claims the benefits under 35 USC § 119 (e) of U.S. provisional application No. 61/560,103 filed Nov. 15, 2011, incorporated by reference in its entirety.

The present invention generally relates to a cost-effective and time-efficient method for applying a crosslinked hydrophilic coating onto a silicone hydrogel contact lens to improve its hydrophilicity and lubricity. In addition, the present invention provides an ophthalmic lens product.

BACKGROUND

Soft silicone hydrogel contact lenses are increasingly becoming popular because of their high oxygen permeability and comfort. But, a silicone hydrogel material typically has a surface, or at least some areas of its surface, which is hydrophobic (non-wettable) and susceptible to adsorbing lipids or proteins from the ocular environment and may adhere to the eye. Thus, a silicone hydrogel contact lens will generally require a surface modification.

A known approach for modifying the hydrophilicity of a relatively hydrophobic contact lens material is through the use of a plasma treatment, for example, commercial lenses such as Focus NIGHT & DAY™ and O2OPTIX™ (CIBA VISION), and PUREVISION™ (Bausch & Lomb) utilize this approach in their production processes. Advantages of a plasma coating, such as, e.g., those may be found with Focus NIGHT & DAY™, are its durability, relatively high hydrophilicity/wettability), and low susceptibility to lipid and protein deposition and adsorption. But, plasma treatment of silicone hydrogel contact lenses may not be cost effective, because the preformed contact lenses must typically be dried before plasma treatment and because of relative high capital investment associated with plasma treatment equipment.

Another approach for modifying the surface hydrophilicity of a silicone hydrogel contact lens is the incorporation of wetting agents (hydrophilic polymers) into a lens formulation for making the silicone hydrogel contact lens as proposed in U.S. Pat. Nos. 6,367,929, 6,822,016, 7,052,131, and 7,249,848. This method may not require additional posterior processes for modifying the surface hydrophilicity of the lens after cast-molding of silicone hydrogel contact lenses. However, wetting agents may not be compatible with the silicone components in the lens formulation and the incompatibility may impart haziness to the resultant lenses. Further, such surface treatment may be susceptible to lipid deposition and adsorption. In addition, such surface treatment may not provide a durable surface for extended wear purposes.

A further approach for modifying the hydrophilicity of a relatively hydrophobic contact lens material is a layer-by-layer (LbL) polyionic material deposition technique (see for example, U.S. Pat. No. 6,451,871, U.S. Pat. No. 6,717,929, U.S. Pat. No. 6,793,973, U.S. Pat. No. 6,884,457, U.S. Pat. No. 6,896,926, U.S. Pat. No. 6,926,965, U.S. Pat. No. 6,940,580, and U.S. Pat. No. 7,297,725, and U.S. Patent Application Publication Nos. US 2007/0229758A1, US 2008/0174035A1, and US 2008/0152800A1). Although the LbL deposition technique can provide a cost effective process for rendering a silicone hydrogel material wettable, LbL coatings may not be as durable as plasma coatings and may have relatively high densities of surface charges; which may interfere with contact lens cleaning and disinfecting solutions. To improve the durability, crosslinking of LbL coatings on contact lenses has been proposed in commonly-owned copending US patent application publication Nos. 2008/0226922 A1 and 2009/0186229 A1 (incorporated by reference in their entireties). However, crosslinked LbL coatings may have a hydrophilicity and/or wettability inferior than original LbL coatings (prior to crosslinking) and still have relative high densities of surface charges.

A still further approach for modifying the hydrophilicity of a relatively hydrophobic contact lens material is to attach hydrophilic polymers onto contact lenses according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, US Patent Application Publication Nos. 2009/0145086 A1, 2009/0145091A1, 2008/0142038A1, and 2007/0122540A1, all of which are herein incorporated by reference in their entireties). Although those techniques can be use in rendering a silicone hydrogel material wettable, they may not be cost-effective and/or time-efficient for implementation in a mass production environment, because they typically require relatively long time and/or involve laborious, multiple steps to obtain a hydrophilic coating.

Therefore, there is still a need for a method of producing silicone hydrogel contact lenses with wettable and durable coating (surface) in a cost-effective and time-efficient manner.

SUMMARY OF THE INVENTION

The invention, in one aspect, provides a method for producing silicone hydrogel contact lenses each having a crosslinked hydrophilic coating thereon, the method of invention comprising the steps of: (a) obtaining a silicone hydrogel contact lens; (b) applying a layer of carboxyl-containing polymeric material onto the silicone hydrogel contact lens; (c) placing the silicone hydrogel contact lens with the layer of carboxyl-containing polymeric material thereon into a lens package containing a packaging solution, wherein the packaging solution comprises one or more crosslinkable hydrophilic polymeric materials selected from the group consisting of (i) a water-soluble hydrophilic polymer polymeric material having epoxide groups, wherein the hydrophilic polymeric material is partial reaction product of a first multi-arm polyethyleneglycol having terminal epoxide groups and a first hydrophilicity-enhancing agent having at least one reactive functional group selected from the group consisting of amino group, carboxyl group, hydroxyl group, thiol group, and combination thereof, (ii) a second multi-arm polyethyleneglycol having terminal epoxide groups, (iii) a mixture of a third multi-arm polyethyleneglycol having terminal epoxide groups and a second hydrophilicity-enhancing agent having at least one reactive functional group selected from the group consisting of amino group, carboxyl group, hydroxyl group, thiol group, and combination thereof, and (iv) a combination thereof; (d) sealing the package; (e) autoclaving the sealed package with the silicone hydrogel contact lens therein at a temperature from about 115° C. to about 125° C. for at least about twenty minutes, thereby forming a non-silicone hydrogel coating on the silicone hydrogel contact lens, wherein the non-silicone hydrogel coating is a crosslinked polymeric material composed of the carboxyl-containing polymeric material crosslinked with the one or more crosslinkable material.

In another aspect, the invention provides a silicone hydrogel contact lens obtained according to a method of the invention, wherein the silicone hydrogel contact lens has an oxygen permeability of at least about 40 barrers, a surface wettability characterized by a water contact angle of about 100 degrees or less, and a good coating durability characterized by surviving a digital rubbing test.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Reference now will be made in detail to the embodiments of the invention. It will be apparent to those skilled in the art that various modifications, variations and combinations can be made in the present invention without departing from the scope or spirit of the invention. For instance, features illustrated or described as part of one embodiment, can be used on another embodiment to yield a still further embodiment. Thus, it is intended that the present invention cover such modifications, variations and combinations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

A "silicone hydrogel contact lens" refers to a contact lens comprising a silicone hydrogel material.

A "hydrogel" refers to a crosslinked polymeric material which is not water-soluble and contains at least 10% by weight of water within its polymer matrix when fully hydrated. A "silicone hydrogel" refers to a silicone-containing hydrogel. A "non-silicone hydrogel" refers to a hydrogel that is free of silicone.

A "crosslinked coating" or "hydrogel coating" as used in this application means a crosslinked polymeric material having a three-dimensional network that can contain water when fully hydrated. The three-dimensional network of a crosslinked polymeric material can be formed by crosslinking of two or more linear or branched polymers through crosslinkages.

A "vinylic monomer", as used herein, refers to a compound that has one sole ethylenically unsaturated group and can be polymerized actinically or thermally.

The term "olefinically unsaturated group" or "ethylenically unsaturated group" is employed herein in a broad sense and is intended to encompass any groups containing at least one >C═C< group. Exemplary ethylenically unsaturated groups include without limitation (meth)acryloyl

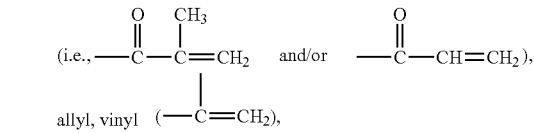

styrenyl, or other C═C containing groups.

The term "(meth)acrylamide" refers to methacrylamide and/or acrylamide.

The term "(meth)acrylate" refers to methacrylate and/or acrylate.

A "hydrophilic vinylic monomer", as used herein, refers to a vinylic monomer which as a homopolymer typically yields a polymer that is water-soluble or can absorb at least 10 percent by weight water when fully hydrated.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a medium and high molecular weight compound or polymer that contains two or more ethylenically unsaturated groups. Medium and high molecular weight typically means average molecular weights greater than 700 Daltons.

A "crosslinker" refers to a compound having at least two ethylenically unsaturated groups. A "crosslinking agent" refers to a crosslinker having a molecular weight of about 700 Daltons or less.

A "polymer" means a material formed by polymerizing/crosslinking one or more monomers or macromers or prepolymers.

"Molecular weight" of a polymeric material (including monomeric or macromeric materials), as used herein, refers to the weight-average molecular weight unless otherwise specifically noted or unless testing conditions indicate otherwise.

A "multi-arm polyethylene glycol" means a polymeric material composed of a branched core and arms each essentially made of polyethylene glycol chains.

The term "amino group" refers to a primary or secondary amino group of formula —NHR', where R' is hydrogen or a $C_1$-$C_{20}$ unsubstituted or substituted, linear or branched alkyl group, unless otherwise specifically noted.

The term "phosphorylcholine" refers to a zwitterionic group of

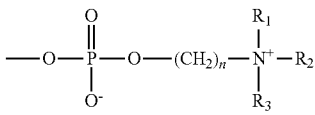

in which n is an integer of 1 to 5 and $R_1$, $R_2$ and $R_3$ independently of each other are $C_1$-$C_8$ alkyl or $C_1$-$C_8$ hydroxyalkyl.

The term "reactive vinylic monomer" refers to a vinylic monomer having a carboxyl group or an amino group (i.e., a primary or secondary amino group).

The term "non-reactive hydrophilic vinylic monomer" refers to a hydrophilic vinylic monomer which is free of any carboxyl group or amino group (i.e., primary or secondary amino group). A non-reactive vinylic monomer can include a tertiary or quaternium amino group.

The term "water-soluble" in reference to a polymer means that the polymer can be dissolved in water to an extent sufficient to form an aqueous solution of the polymer having a concentration of up to about 30% by weight at room temperature (defined above).

A "water contact angle" refers to an average water contact angle (i.e., contact angles measured by Sessile Drop method), which is obtained by averaging measurements of contact angles with at least 3 individual contact lenses.

The term "intactness" in reference to a coating on a SiHy contact lens is intended to describe the extent to which the contact lens can be stained by Sudan Black in a Sudan Black staining test described in Example 1. Good intactness of the coating on a SiHy contact lens means that there is practically no Sudan Black staining of the contact lens.

The term "durability" in reference to a coating on a SiHy contact lens is intended to describe that the coating on the SiHy contact lens can survive a digital rubbing test.

The intrinsic "oxygen permeability", Dk, of a material is the rate at which oxygen will pass through a material. In accordance with the invention, the term "oxygen permeability (Dk)" in reference to a hydrogel (silicone or non-silicone) or a contact lens means an oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm \text{ Hg})] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm \text{ Hg})] \times 10^{-9}$.

The "ion permeability" through a lens correlates with the Ionoflux Diffusion Coefficient. The Ionoflux Diffusion Coefficient, D (in units of [mm$^2$/min]), is determined by applying Fick's law as follows:

$$D = -n'/(A \times dc/dx)$$

where n'=rate of ion transport [mol/min]; A=area of lens exposed [mm$^2$]; dc=concentration difference [mol/L]; dx=thickness of lens [mm].

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The invention is generally directed to a cost-effective and time-efficient method for making silicone hydrogel contact lenses with durable non-silicone hydrogel coatings by use of a water-soluble and crosslinkable hydrophilic polymeric material having epoxide groups. The invention is partly based on the surprising discoveries that a water-soluble, epoxy-containing multi-arm poly(ethylene glycol) or a water-soluble, epoxy-containing hydrophilic polymeric material which is a partial reaction product of a water-soluble, epoxy-containing multi-arm poly(ethylene glycol) with at least one hydrophilicity-enhancing agent having at least one reactive functional group selected from the group consisting of amino group, carboxyl group, hydroxyl group, thiol group, and combination thereof, can be used to form a non-silicone hydrogel coating with a good surface hydrophilicity and/or wettability, a good hydrophilicity and a good intactness on a silicone hydrogel contact lens having carboxyl acid and/or amino groups at or near its surface, during the sterilization (i.e., autoclave) step of contact lens product. At the temperature of autoclave (from 110 to 130° C.), epoxide groups react with functional groups such as amino groups, thiol groups, carboxyl groups —COOH, and/or hydroxyl groups to form neutral, hydroxyl-containing covalent linkages. Those epoxide groups that do not participate in crosslinking reactions can be hydrolyzed during autoclave. It is believed that a multi-arm polyethyleneglycol with terminal epoxide groups can ensure resultant hydrogel coating to have a relatively low crosslinking density (or a loose 3-dimensional structure with dangling polymer chains and/or chain segments that may impart a good surface hydrophilicity, wettability and/or lubricity to the contact lenses.

By using the method of the invention, the coating process can be combined with the sterilization step (autoclave) in the manufacturing of silicone hydrogel contact lenses. Typically, contact lenses, which are hydrated and packaged in a packaging solution, must be sterilized. Sterilization of the hydrated lenses during manufacturing and packaging is typically accomplished by autoclaving. The autoclaving process involves heating the packaging of a contact lens to a temperature of from about 115° C. to about 125° C. for approximately 20-40 minutes under pressure. The resultant contact lenses not only can have a high surface hydrophilicity/wettability, no or minimal surface changes, good intactness, and good durability, but also can be used directly from the lens package by a patient without washing and/or rising because of the ophthalmic compatibility of the packaging solution.

The invention, in one aspect, provides a method for producing silicone hydrogel contact lenses each having a crosslinked hydrophilic coating thereon, the method of invention comprising the steps of: (a) obtaining a silicone hydrogel contact lens; (b) applying a layer of carboxyl-containing polymeric material onto the silicone hydrogel contact lens; (c) placing the silicone hydrogel contact lens with the layer of carboxyl-containing polymeric material thereon into a lens package containing a packaging solution, wherein the packaging solution comprises one or more crosslinkable hydrophilic polymeric materials selected from the group consisting of (i) a water-soluble hydrophilic polymer polymeric material having epoxide groups, wherein the hydrophilic polymeric material is partial reaction product of a first multi-arm polyethyleneglycol having terminal epoxide groups and a first hydrophilicity-enhancing agent having at least one reactive functional group selected from the group consisting of amino group, carboxyl group, hydroxyl group, thiol group, and combination thereof, (ii) a second multi-arm polyethyleneglycol having terminal epoxide groups, (iii) a mixture of a third multi-arm polyethyleneglycol having terminal epoxide groups and a second hydrophilicity-enhancing agent having at least one reactive functional group selected from the group consisting of amino group, carboxyl group, hydroxyl group, thiol group, and combination thereof, and (iv) a combination thereof; (d) sealing the package; (e) autoclaving the sealed package with the silicone hydrogel contact lens therein at a temperature from about 115° C. to about 125° C. for at least about twenty minutes, thereby forming a non-silicone hydrogel coating on the silicone hydrogel contact lens, wherein the non-silicone hydrogel coating is a crosslinked polymeric material composed of the carboxyl-containing polymeric material crosslinked with the one or more crosslinkable material.

A person skilled in the art knows very well how to make contact lenses. For example, contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810. In cast-molding, a lens formulation typically is dispensed into molds and cured (i.e., polymerized and/or crosslinked) in molds for making contact lenses. For production of silicone hydrogel contact lenses, a lens formulation for cast-molding generally comprises at least one components selected from the group consisting of a silicone-containing vinylic monomer, a silicone-containing vinylic macromer, a silicone-containing prepolymer, a hydrophilic vinylic monomer, a hydrophilic vinylic macromer, a hydrophobic vinylic monomer, and combination thereof, as well known to a person skilled in the art. A silicone hydrogel contact lens formulation can also comprise other necessary components known to a person skilled in the art, such as, for example, a crosslinking agent, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art. Molded silicone hydrogel contact lenses then can be subjected to extraction with an extraction solvent to remove unpolymerized components from the molded lenses and to hydration process, as known by a person skilled in the art. Numerous silicone hydrogel lens formulations have been described in numerous patents and patent applications published by the filing date of this application.

A layer of a carboxyl-containing polymeric material can be applied onto a silicone hydrogel contact lens by contacting the contact lens with a solution of the carboxyl-containing polymeric material. Contacting of a contact lens with a coating solution can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds. Examples of contacting methods are described in U.S. Pat. Nos. 6,451,871, 6,719,929, 6,793,973, 6,811,805, and 6,896,926 and in U.S. Patent Application Publication Nos. 2007/0229758A1, 2008/0152800A1, and 2008/0226922A1, (herein incorporated by references in their entireties).

In accordance with this embodiment, the carboxyl-containing polymeric material can be a linear or branched polymer having pendant carboxyl groups. Any polymers having pendant carboxyl groups can be used in forming the layer of the carboxyl-containing material on silicone hydrogel contact lenses. Examples of such carboxyl-containing polymers include without limitation: a homopolymer of a carboxyl-containing vinylic monomer (any one as described below); a copolymer of two or more carboxyl-containing vinylic monomers; a copolymer of a carboxyl-containing vinylic monomer with one or more vinylic monomers, preferably with one or more non-reactive hydrophilic vinylic monomers; a carboxyl-containing cellulose (e.g., carboxymethyl cellulose, carboxyethyl cellulose, carboxypropyl cellulose); poly(glutamic acid); poly(aspartic acid); and combinations thereof.

Examples of carboxyl-containing vinylic monomers include without limitation acrylic acid, a $C_1$-$C_4$ alkylacrylic acid (e.g., methacrylic acid, ethylacrylic acid, propylacrylic acid, butylacrylic acid), N,N-2-acrylamidoglycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, and combination thereof.

Preferred examples of non-reactive hydrophilic vinylic monomers include without limitation acrylamide (AAm), methacrylamide N,N-dimethylacrylamide (DMA), N,N-dimethylmethacrylamide (DMMA), N-vinylpyrrolidone (NVP), N,N,-dimethylaminoethylmethacrylate (DMAEM), N,N-dimethylaminoethylacrylate (DMAEA), N,N-dimethylaminopropylmethacrylamide (DMAPMAm), N,N-dimethylaminopropylacrylamide (DMAPAAm), glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), a phosphorylcholine-containing vinylic monomer (including (meth)acryloyloxyethyl phosphorylcholine and those described in U.S. Pat. No. 5,461,433, herein incorporated by reference in its entirety), and combinations thereof.

Preferably, the carboxyl-containing polymeric material used in the invention is polyacrylic acid, polymethacrylic acid, poly($C_2$-$C_{12}$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_{12}$ alkylacrylic acid-co-vinylpyrrolidone], hydrolyzed poly[(meth)acrylic acid-co-vinylacetate], hydrolyzed poly[$C_2$-$C_{12}$ alkylacrylic acid-co-vinylacetate], polyethyleneimine (PEI), polyallylamine hydrochloride (PAH) homo- or copolymer, polyvinylamine homo- or copolymer, or combinations thereof.

The weight average molecular weight $M_w$ of a carboxyl-containing polymeric material used in the invention is at least about 10,000 Daltons, preferably at least about 50,000 Daltons, more preferably from about 100,000 Daltons to about 5,000,000 Daltons.

A solution of a carboxyl-containing polymeric material can be prepared by dissolving the carboxyl-containing polymeric material in water, a mixture of water and one or more organic solvents miscible with water, an organic solvent, or a mixture of one or more organic solvents. Preferably, the carboxyl-containing polymeric material is dissolved in a mixture of water and one or more organic solvents, an organic solvent, or a mixture of one or more organic solvent. It is believed that a solvent system containing at least one organic solvent can swell a silicone hydrogel contact lens so that a portion of the carboxyl-containing polymeric material may penetrate into the silicone hydrogel contact lens and increase the durability of the hydrogel coating to be formed. Any organic solvents can be used in preparation of a solution of the carboxyl-containing polymeric material. Examples of preferred organic solvents include without limitation tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, methanol, ethanol, 1- or 2-propanol, 1- or 2-butanol, tert-butanol, tert-amyl alcohol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (by autoclave at about 120° C. or higher for at least about 20 minutes) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (or water-soluble viscosity builders) (e.g., cellulose derivatives, polyvinyl alcohol, polyvinylpyrrolidone).

The packaging solution contains a buffering agent in an amount sufficient to maintain a pH of the packaging solution in the desired range, for example, preferably in a physiologically acceptable range of about 6 to about 8.5. Any known, physiologically compatible buffering agents can be used. Suitable buffering agents as a constituent of the contact lens care composition according to the invention are known to the person skilled in the art.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 7.5 centipoises, preferably from about 1.2 centipoises to about 5 centipoises, more preferably from about 1.5 centipoises to about 4 centipoises, at 25° C.

In accordance with the invention, the packaging solution comprises one or more crosslinkable materials selected from the group consisting of (i) a water-soluble hydrophilic polymer polymeric material having epoxide groups, wherein the hydrophilic polymeric material is partial reaction product of a first multi-arm polyethyleneglycol having terminal epoxide groups and a first hydrophilicity-enhancing agent having at least one reactive functional group selected from the group consisting of amino group, carboxyl group, hydroxyl group, thiol group, and combination thereof, (ii) a second multi-arm polyethyleneglycol having terminal epoxide groups, (iii) a mixture of a third multi-arm polyethyleneglycol having terminal epoxide groups and a second hydrophilicity-enhancing agent having at least one reactive functional group selected from the group consisting of amino group, carboxyl group, hydroxyl group, thiol group, and combination thereof, and (iv) a combination thereof. In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of one or more crosslinkable material.

Any multi-arm polyethylene glycol terminated with epoxide groups can be used in the invention. Various multi-arm polyethylene glycols terminated with epoxide groups can be obtained commercial sources, e.g., Laysan Bio, Inc. (Arab, Ala., USA), Creative PEGWorks (Winston Salem, N.C., USA), etc. Alternatively, multi-arm polyethylene glycols terminated with epoxide groups can be obtained from commercially available multi-arm polyethylene glycols with terminal thiol, amino (primary or secondary), carboxyl, or hydroxyl groups. For example, a commercially-available multi-arm polyethylene glycol terminated with thiol groups (e.g., from Sigma-Aldrich) can be reacted with glycidyl (meth)acrylate under Michael Addition reaction to form a multi-arm polyethylene glycols terminated with epoxide groups. Further, a commercially-available multi-arm polyethylene glycol terminated with (primary or secondary)

amino groups, carboxyl groups or hydroxyl groups (e.g., from Sigma-Aldrich) can be reacted with a 1-chloro-2,3-epoxypropane under known coupling reaction conditions to form a multi-arm polyethylene glycol with terminal epoxide groups.

In accordance with the invention, a water-soluble hydrophilic polymer polymeric material having epoxide groups is a partial reaction product of a first multi-arm polyethyleneglycol having terminal epoxide groups and a first hydrophilicity-enhancing agent having at least one reactive functional group selected from the group consisting of amino group, carboxyl group, hydroxyl group, thiol group, and combination thereof. The water-soluble hydrophilic polymer polymeric material having epoxide groups preferably comprises (i.e., has a composition including) from about 20% to about 95%, more preferably from about 35% to about 90%, even more preferably from about 50% to about 85%, by weight of first polymer chains derived from a first multi-arm polyethyleneglycol having terminal epoxide groups and preferably from about 5% to about 80%, more preferably from about 10% to about 65%, even more preferably from about 15% to about 50%, by weight of hydrophilic moieties or second polymer chains derived from at least one hydrophilicity-enhancing agent having at least one reactive functional group selected from the group consisting of amino group, carboxyl group, hydroxyl group, thiol group, and combination thereof. The composition of the hydrophilic polymeric material is determined by the composition (based on the total weight of the reactants) of a reactants mixture used for preparing the crosslinkable hydrophilic polymeric material. For example, if a reactant mixture comprises about 75% by weight of a first multi-arm polyethyleneglycol having terminal epoxide groups and about 25% by weight of at least one hydrophilicity-enhancing agent based on the total weight of the reactants, then the resultant hydrophilic polymeric material comprise about 75% by weight of first polymer chains derived from the first multi-arm polyethyleneglycol having terminal epoxide groups and about 25% by weight of hydrophilic moieties or second polymer chains derived from said at least one hydrophilicity-enhancing agent. The epoxide groups of the crosslinkable hydrophilic polymeric material are those epoxide groups (of the first multi-arm polyethyleneglycol having terminal epoxide groups) which do not participate in crosslinking reactions for preparing the crosslinkable hydrophilic polymeric material.

Any suitable hydrophilicity-enhancing agents can be used in the invention so long as they contain at least one amino group, at least one carboxyl group, at least one hydroxyl, and/or at least one thiol group.

A preferred class of hydrophilicity-enhancing agents include without limitation: amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-β-D-galactose, 1-amino-1-deoxysorbitol, 1-methylamino-1-deoxysorbitol, N-aminoethyl gluconamide); amino-, carboxyl- or thiol-containing disaccharides (e.g., chondroitin disaccharide sodium salt, di(β-D-xylopyranosyl)amine, digalacturonic acid, heparin disaccharide, hyaluronic acid disaccharide, Lactobionic acid); and amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more amino, carboxyl and/or thiol groups. More preferably, the content of monomeric units having an amino (—NHR' with R' as defined above), carboxyl (—COOH) and/or thiol (—SH) group in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

Another preferred class of hydrophilic polymers as hydrophilicity-enhancing agents are amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NS CO_2H$)—), or combinations thereof.

Another preferred class of hydrophilic polymers as hydrophilicity-enhancing agents include without limitation: poly (ethylene glycol) (PEG) with one sole amino, carboxyl, thiol, or hydroxyl group (e.g., PEG-$NH_2$, PEG-SH, PEG-COOH, PEG-OH); $H_2$N-PEG-$NH_2$; HOOC-PEG-COOH; HS-PEG-SH; $H_2$N-PEG-COOH; HOOC-PEG-SH; $H_2$N-PEG-SH; multi-arm PEG with one or more amino, hydroxyl, carboxyl and/or thiol groups; PEG dendrimers with one or more amino, hydroxyl, carboxyl and/or thiol groups; a diamino- or dicarboxyl-terminated homo- or co-polymer of a non-reactive hydrophilic vinylic monomer (any one described above); a monoamino- or monocarboxyl-terminated homo- or co-polymer of a non-reactive hydrophilic vinylic monomer (any one described above); a copolymer which is a polymerization product of a composition comprising (1) about 50% by weight or less, preferably from about 0.1% to about 30%, more preferably from about 0.5% to about 20%, even more preferably from about 1% to about 15%, by weight of one or more reactive vinylic monomers (having at least one amino or carboxyl groups) and (2) at least one non-reactive hydrophilic vinylic monomer (any one described above) and/or at least one phosphorylcholine-containing vinylic monomer; and combinations thereof.

Examples of preferred reactive vinylic monomers include without limitation amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, acrylic acid, $C_1$-$C_4$ alkylacrylic acid (e.g., methacrylic ethylacrylic acid, propylacrylic acid, butylacrylic acid), N,N-2-acrylamido-glycolic acid, beta methyl-acrylic acid (crotonic acid), alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, tricarboxy ethylene, and combinations thereof. Preferably, the reactive vinylic monomer is selected from the group consisting of amino-$C_2$-$C_6$ alkyl (meth)acrylate, $C_1$-$C_6$ alkylamino-$C_2$-$C_6$ alkyl (meth)acrylate, allylamine, vinylamine, amino-$C_1$-$C_6$ alkyl (meth)acrylamide, $C_1$-$C_6$ alkylamino-$C_2$-$C_6$ alkyl (meth)acrylamide, acrylic acid, $C_1$-$C_6$ alkylacrylic acid, N,N-2-acrylamidoglycolic acid, and combinations thereof.

In a more preferred embodiment, a hydrophilic polymer as a hydrophilicity-enhancing agent is PEG-$NH_2$; PEG-SH; PEG-COOH; $H_2$N-PEG-$NH_2$; HOOC-PEG-COOH; HS-PEG-SH; $H_2$N-PEG-COOH; HOOC-PEG-SH; $H_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acrylamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of (meth)acrylic acid, $C_2$-$C_{12}$ alkylacrylic acid, vinylamine, allylamine and/or amino-$C_2$-$C_4$ alkyl (meth)acrylate, and (2) (meth)acryloyloxyethyl phosphorylcholine and/or at least one non-reactive hydrophilic vinylic monomer selected from the group consisting of acrylamide, N,N-dimethylacrylamide, N-vinylpyrrolidone, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

Most preferably, the hydrophilicity-enhancing agent is PEG-$NH_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly[(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly[(meth)acrylic acid-co-NVP] with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of a carboxylic acid containing vinylic monomer and/or an amino-containing vinylic monomer; and combination thereof.

PEGs with functional groups and multi-arm PEGs with functional groups can be obtained from various commercial suppliers, e.g., Sigma-Aldrich, Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

As used herein, a copolymer of a non-reactive hydrophilic vinylic monomer refers to a polymerization product of a non-reactive hydrophilic vinylic monomer with one or more additional vinylic monomers. Copolymers comprising a non-reactive hydrophilic vinylic monomer and a reactive vinylic monomer (e.g., a carboxyl-containing vinylic monomer) can be prepared according to any well-known radical polymerization methods or obtained from commercial suppliers. Copolymers containing methacryloyloxyethyl phosphorylcholine and carboxyl-containing vinylic monomer can be obtained from NOP Corporation (e.g., LIPIDURE®-A and -AF).

The weight average molecular weight $M_w$ of the hydrophilic polymer having at least one amino, carboxyl or thiol group (as a hydrophilicity-enhancing agent) is preferably from about 500 to about 1,000,000, more preferably from about 1,000 to about 500,000.

In accordance with the invention, the reaction between a hydrophilicity-enhancing agent and a multi-arm polyethylene glycol with terminal epoxide groups is carried out at a temperature of from about 40° C. to about 80° C. for a period of time sufficient (from about 0.3 hour to about 24 hours, preferably from about 1 hour to about 12 hours, even more preferably from about 2 hours to about 8 hours) to form a water-soluble crosslinkable hydrophilic polymeric material containing epoxide groups.

In accordance with the invention, the concentration of a hydrophilicity-enhancing agent relative to a multi-arm polyethylene glycol with terminal epoxide groups must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the epoxide groups of the epichlorohydrin-functionalized polyamine or polyamidoamine.

The packaging solution preferably comprises an α-oxo-multi-acid or salt thereof in an amount sufficient to have a reduced susceptibility to oxidation degradation of the polyethylene glycol segments. A commonly-owned co-pending patent application (US patent application publication No. 2004/0116564 A1, incorporated herein in its entirety) discloses that oxo-multi-acid or salt thereof can reduce the susceptibility to oxidative degradation of a PEG-containing polymeric material.

Exemplary α-oxo-multi-acids or biocompatible salts thereof include without limitation citric acid, 2-ketoglutaric acid, or malic acid or biocompatible (preferably ophthalmically compatible) salts thereof. More preferably, an α-oxo-multi-acid is citric or malic acid or biocompatible (preferably ophthalmically compatible) salts thereof (e.g., sodium, potassium, or the like).

In accordance with the invention, the packaging solution can further comprises mucin-like materials, phospholipids, ophthalmically beneficial materials, and/or surfactants.

Exemplary mucin-like materials include without limitation polyglycolic acid, polylactides, and the likes. A mucin-like material can be used as guest materials which can be released continuously and slowly over extended period of time to the ocular surface of the eye for treating dry eye syndrome. The mucin-like material preferably is present in effective amounts.

Exemplary ophthalmically beneficial materials include without limitation 2-pyrrolidone-5-carboxylic acid (PCA), amino acids (e.g., taurine, glycine, etc.), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Surfactants can be virtually any ocularly acceptable surfactant including non-ionic, anionic, and amphoteric surfactants. Examples of preferred surfactants include without limitation poloxamers (e.g., Pluronic® F108, F88, F68, F68LF, F127, F87, F77, P85, P75, P104, and P84), poloamines (e.g., Tetronic® 707, 1107 and 1307, polyethylene glycol esters of fatty acids (e.g., Tween® 20, Tween® 80), polyoxyethylene or polyoxypropylene ethers of $C_{12}$-$C_{18}$ alkanes (e.g., Brij® 35), polyoxyethyene stearate (Myrj® 52), polyoxyethylene propylene glycol stearate (Atlas® G 2612), and amphoteric surfactants under the trade names Mirataine® and Miranol®.

A person skilled in the art knows well how to perform the autoclaving process involved in the invention. In accordance with this embodiment of the invention, the packaging solution is a buffered aqueous solution which is ophthalmically safe after autoclave.

A silicone hydrogel contact lens obtained according a method of the invention has at least one of the properties selected from the group consisting of: an oxygen permeability of at least about 40 barrers, preferably at least about 50 barrers, more preferably at least about 60 barrers, even more preferably at least about 70 barrers; an elastic modulus of about 1.5 MPa or less, preferably about 1.2 MPa or less, more preferably about 1.0 or less, even more preferably from about 0.3 MPa to about 1.0 MPa; an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min; a water content of preferably from about 18% to about 70%, more preferably from about 20% to about 60% by weight when fully hydrated; or combinations thereof.

It should be understood that although various embodiments including preferred embodiments of the invention may be separately described above, they can be combined and/or used together in any desirable fashion in the method of the invention for producing silicone hydrogel contact lenses each having a crosslinked hydrophilic coating thereon.

In another aspect, the invention provides a silicone hydrogel contact lens obtained according to a method of invention described above.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

Example 1

Oxygen Permeability Measurements

The apparent oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 cm$^3$/min., while a nitrogen stream is passed on the opposite side of the lens at a rate of about 10 to 20 cm$^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app} = Jt/(P_{oxygen})$$

where J=oxygen flux [microliters $O_2/cm^2$-minute]

$$P_{oxygen} = (P_{measured} - P_{water}\text{ vapor}) = (\% O_2 \text{ in air stream})[\text{mm Hg}] = \text{partial pressure of oxygen in the air stream}$$

$P_{measured}$=barometric pressure (mm Hg)
$P_{water}$ vapor=0 mm Hg at 34° C. (in a dry cell) (mm Hg)
$P_{water}$ vapor=40 mm Hg at 34° C. (in a wet cell) (mm Hg)
t=average thickness of the lens over the exposed test area (mm)

$Dk_{app}$ is expressed in units of barrers.

The apparent oxygen transmissibility (Dk I/t) of the material may be calculated by dividing the apparent oxygen permeability ($Dk_{app}$) by the average thickness (t) of the lens.

The above described measurements are not corrected for the so-called boundary layer effect which is attributable to the use of a water or saline bath on top of the contact lens during the oxygen flux measurement. The boundary layer effect causes the reported value for the apparent Dk of a silicone hydrogel material to be lower than the actual intrinsic Dk value. Further, the relative impact of the boundary layer effect is greater for thinner lenses than with thicker lenses. The net effect is that the reported Dk appear to change as a function of lens thickness when it should remain constant.

The intrinsic Dk value of a lens can be estimated based on a Dk value corrected for the surface resistance to oxygen flux caused by the boundary layer effect as follows.

Measure the apparent oxygen permeability values (single point) of the reference lotrafilcon A (Focus® N&D® from CIBA VISION CORPORATION) or lotrafilcon B (AirOptiX™ from CIBA VISION CORPORATION) lenses using the same equipment. The reference lenses are of similar optical power as the test lenses and are measured concurrently with the test lenses.

Measure the oxygen flux through a thickness series of lotrafilcon A or lotrafilcon B (reference) lenses using the same equipment according to the procedure for apparent Dk measurements described above, to obtain the intrinsic Dk value ($Dk_i$) of the reference lens. A thickness series should cover a thickness range of approximately 100 µm or more. Preferably, the range of reference lens thicknesses will bracket the test lens thicknesses. The $Dk_{app}$ of these reference lenses must be measured on the same equipment as the test lenses and should ideally be measured contemporaneously with the test lenses. The equipment setup and measurement parameters should be held constant throughout the experiment. The individual samples may be measured multiple times if desired.

Determine the residual oxygen resistance value, $R_r$, from the reference lens results using equation 1 in the calculations.

$$R_r = \frac{\sum\left(\frac{t}{DK_{app}} - \frac{t}{Dk_i}\right)}{n} \quad (1)$$

In which t is the thickness of the test lens (i.e., the reference lens too), and n is the number of the reference lenses measured. Plot the residual oxygen resistance value, $R_r$, vs. t data and fit a curve of the form Y=a+bX where, for the jth lens, $Y_j = (\Delta P/J)_j$ and $X=t_1$. The residual oxygen resistance, $R_r$ is equal to a.

Use the residual oxygen resistance value determined above to calculate the correct oxygen permeability $Dk_c$ (estimated intrinsic Dk) for the test lenses based on Equation 2.

$$Dk_c = t/[(t/Dk_a) - R_r] \quad (2)$$

The estimated intrinsic Dk of the test lens can be used to calculate what the apparent Dk ($Dk_{a\_std}$) would have been for a standard thickness lens in the same test environment based on Equation 3. The standard thickness ($t_{std}$) for lotrafilcon A=85 µm. The standard thickness for lotrafilcon B=60 µm.

$$Dk_{a\_std} = t_{std}/[(t_{std}/Dk_c) + R_{r\_std}] \quad (3)$$

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ $mm^2$/minute.

Lubricity Evaluation

The lubricity rating is a qualitative ranking scheme where a scale of 0 to 4 is used with 0 or lower numbers indicating better lubricity. 1 is assigned to Oasys™/TruEye™ commercial lenses and 4 is assigned to commercial Air Optix™ lenses. The samples are rinsed with excess DI water for at least 3 times and then transferred to PBS before the evaluation. Before the evaluation, hands are rinsed with a soap solution, extensively rinsed with DI water and then dried with KimWipe towels. The samples are handled between the fingers and a numerical number is assigned for each sample relative to the above standard lenses. For consistency, all the ratings are independently collected by the same two operators in order to avoid bias and all the data so far reveal very good agreement and consistency in the evaluation.

Surface Hydrophilicity/Wettability Tests.

Water contact angle on a contact lens is a general measure of the surface hydrophilicity (or wettability) of the contact lens. In particular, a low water contact angle corresponds to more hydrophilic surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wipe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18 MΩcm and the droplet volume used is 2 μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-Up Time (WBUT) Tests.

The wettability of the lenses (after autoclave) is also assessed by determining the time required for the water film to start breaking on the lens surface. Briefly, lenses are removed from the vial and washed 3 times in ~200 ml of fresh DI water in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from DI water and are assigned a WBUT of 0 seconds. Lenses exhibiting WBUT ≥5 seconds are considered wettable and are expected to exhibit adequate wettability (ability to support the tear film) on-eye.

Debris Adhesion Test.

Contact lens with highly charged surface can be susceptible to increased debris adhesion during patient handling. A paper towel (e.g., Tork) is rubbed against gloved hands and then both sides of the lens are rubbed with the fingers to transfer any debris to the lens surface. The lens is briefly rinsed and then observed under a microscope. A qualitative rating scale from 0 (no debris adhesion) to 4 (debris adhesion equivalent to a polyacrylic acid (PAA) coated control lens) is used to rate each lens. Lenses with a score of "0" or "1" are deemed to be acceptable.

Coating Intactness Tests.

The intactness of a coating on the surface of a contact lens can be tested according to Sudan Black stain test as follow. Contact lenses with a coating (an LbL coating, a plasma coating, or any other coatings) are dipped into a Sudan Black dye solution (Sudan Black in vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated.

Tests of Coating Durability.

The lenses are digitally rubbed with Solo-Care® multi-purpose lens care solution for 30 times and then rinsed with saline. The above procedure is repeated for a given times, e.g., from 1 to 30 times, (i.e., number of consecutive digital rubbing tests which imitate cleaning and soaking cycles). The lenses are then subjected to Sudan Black test (i.e., coating intactness test described above) to examine whether the coating is still intact. To survive digital rubbing test, there is no significantly increased staining spots (e.g., staining spots covering no more than about 5% of the total lens surface). Water contact angles are measured to determine the coating durability.

Surface Cracking Test.

Excessive crosslinking of a coating layer can lead to surface cracks after rubbing a lens which are visible under a darkfield microscope. Lenses are inverted and rubbed and any cracking lines are noted. A qualitative rating of 0 (no cracking) to 2 (severe cracking) is used to rate the lenses. Any severe cracking lines are deemed unacceptable.

Example 2

Preparation of Chain-Extended Polydimethylsiloxane Vinylic Macromer with Terminal Methacrylate Groups (CE-PDMS Macromer)

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum (2×10$^{-2}$ mBar). Then, under an atmosphere of dry nitrogen, 320 g of distilled MEK is then added into the reactor and the mixture is stirred thoroughly. 0.235 g of DBTDL is added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at about 55° C. overnight under a blanket of dry nitrogen. The next day, MEK is removed by flash distillation. The reactor is cooled and 22.7 g of IEM are then charged to the reactor followed by about 0.235 g of DBTDL. After about 3 hours, an additional 3.3 g of IEM are added and the reaction is allowed to proceed overnight. The following day, the reaction mixture is cooled to about 18° C. to obtain CE-PDMS macromer with terminal methacrylate groups.

Example 3

Preparation of Lens Formulations

A lens formulation is prepared by dissolving components in 1-propanol to have the following composition: 33% by weight of CE-PDMS macromer prepared in Example 2, 17% by weight of N-[tris(trimethylsiloxy)-silylpropyl]acrylamide (TRIS-Am), 24% by weight of N,N-dimethylacrylamide (DMA), 0.5% by weight of N-(carbonyl-methoxypolyethylene glycol-2000)-1,2-disteaoyl-sn-glycero-3-phosphoethanolamin, sodium salt) (L-PEG), 1.0% by weight Darocur 1173 (DC1173), 0.1% by weight of visitint (5% copper phthalocyanine blue pigment dispersion in tris(trimethylsiloxy)silylpropylmethacrylate, TRIS), and 24.5% by weight of 1-propanol.

Preparation of Lenses

Lenses are prepared by cast-molding from the lens formulation prepared above in a reusable mold, similar to the mold shown in FIGS. 1-6 in U.S. Pat. Nos. 7,384,590 and 7,387,759 (FIGS. 1-6). The mold comprises a female mold half made of quartz (or $CaF_2$) and a male mold half made of glass (or PMMA). The UV irradiation source is a Hamamatsu lamp with the WG335+TM297 cut off filter at an intensity of about 4 $mW/cm^2$. The lens formulation in the mold is irradiated with UV irradiation for about 25 seconds. Cast-molded lenses are extracted with isopropanol (or methyl ethyl ketone, MEK), rinsed in water, coated with polyacrylic acid (PAA) by dipping lenses in a propanol solution of PAA (0.0036% by weight, acidified with formic acid to about pH 2.0), and hydrated in water. Resultant lenses having a reactive PAA-LbL base coating thereon are determined to have the following properties: ion permeability of about 8.0 to about 9.0 relative to Alsacon lens material; apparent Dk (single point) of about 90 to 100; a water content of about 30% to about 33%; and an elastic modulus of about 0.60 MPa to about 0.65 MPa.

Example 4

4-arm PEG epoxide (Mw 10,000) is purchased from Laysan Bio, Inc. and used as received. Phosphate buffered saline (PBS) containing NaCl (0.75% by weight), $NaH_2PO_4.H_2O$ (0.0536% by weight), $Na_2HPO_4.2H_2O$ (0.3576% by weight) and DI water (97.59% by weight) is prepared.

An IPC saline is prepared by adding 1% of 4-arm polyethylene glycol epoxides (4-arm PEG-epoxide) to the PBS prepared above and adjusting the pH to 7.2~7.4.

Silicon hydrogel lenses prepared in Example 3 are extracted and coated by dipping in the following series of baths: 3 MEK baths (22, 78 and 224 seconds), 1 DI water rinse bath (56 seconds), 2 baths of PAA coating solution which is prepared by dissolving 0.036 gm of PAA (Mw: 450 kDa, from Lubrizol) in 975 ml of 1-propanol and 25 ml of formic acid, for 44 and 56 seconds separately; and 3 DI water baths each for 56 seconds.

Lenses having a PAA-LbL coating as described above are placed in a polypropylene shell with 0.55 ml of the IPC saline (half of the saline is added prior to inserting the lens). The blister is then sealed with foil and autoclaved for about 30 minutes at about 121° C., forming a crosslinked (or hydrogel) coating on the lenses.

The resultant lenses pass debris adhesion test according to the procedures described in Example 1. The lenses have a WBUT of longer than 10 seconds. The lenses are very lubricious based on qualitative finger rubbing tests (lubricity rating of 1).

Example 5

Epoxide PEG epoxide (Mw 10,000) is purchased from Laysan Bio and used as received. PBS containing NaCl (0.75% by weight), $NaH_2PO_4.H_2O$ (0.0536% by weight), $Na_2HPO_4.2H_2O$ (0.3576% by weight) and DI water (97.59% by weight) is prepared. An IPC saline is prepared by adding 0.1% of Epoxides-PEG-epoxide) to the prepared PBS and adjusting the pH to 7.2~7.4.

Lenses having a PAA-LbL coating as described in Example 4 are placed in a polypropylene shell with 0.55 ml of the IPC saline (half of the saline is added prior to inserting the lens). The blister is then sealed with foil and autoclaved for about 30 minutes at about 121° C., forming a crosslinked (or hydrogel) coating on the lenses.

The resultant lenses pass debris adhesion test. The lenses have a WBUT of longer than 10 seconds. The lenses are very lubricious based on qualitative finger rubbing tests (lubricity rating of 1).

Example 6

Polyethylene imine branched (PEIB, Mw 25000) is purchased from Aldrich and used as received. An IPC saline is prepared by adding 5% of 4-arm polyethylene glycol epoxides (4-arm PEG-epoxide) and 0.001% PEIB to the phosphate buffered saline (PBS) and adjusting the pH to 7.2~7.4.

Lenses having a PAA-LbL coating as described in Example 4 are placed in a polypropylene shell with 0.55 ml of the IPC saline (half of the saline is added prior to inserting the lens). The blister is then sealed with foil and autoclaved for about 30 minutes at about 121° C., forming a crosslinked (hydrogel) coating on the contact lens.

The resultant lenses pass debris adhesion test. The lenses have a WBUT of 6 seconds. The lenses are very lubricious based on qualitative finger rubbing tests (lubricity rating of 1).

Example 7

Starch (starch from potatoes) purchased from Sigma Aldrich and used as received. An IPC solution is prepared by adding 5 wt % 4-arm polyethylene glycol epoxides (4-arm PEG-epoxide) along with 0.1 wt % of starch to phosphate buffered saline (PBS prepared as described in Example 4). The final pH is adjusted to 11.5. The solution is then heat treated at 40° C. for 3 hours. After the heat treatment, the pH of the solution is adjusted to 7.2~7.4 and then filtered using a 0.22 micron polyether sulphone (PES) membrane filter.

Lenses having a PAA-LbL coating as described in Example 4 are placed in a polypropylene shell with 0.55 ml of the IPC saline (half of the saline is added prior to inserting the lens). The blister is then sealed with foil and autoclaved for about 30 minutes at about 121° C., forming a covalently bonded coating (PAA-x-hydrophilic polymeric material) on the lenses.

The resultant lenses pass debris adhesion test (rating of 1). The lenses have a WBUT of 10 seconds. The lenses are more lubricious than Air Optix™ lenses based on qualitative finger rubbing tests (lubricity rating of 2).

Example 8

Dextran (Mw. 188000) was purchased from Sigma Aldrich and used as received. An IPC solution is prepared by adding 5 wt % 4-arm polyethylene glycol epoxides (4-arm PEG-epoxide) along with 0.5 wt % of Dextran to phosphate buffered saline (PBS prepared as described in Example 4). The final pH is adjusted to 11.5. The solution is then heat treated at 40° C. for 3 hours. After the heat treatment, the pH of the solution is adjusted to 7.2~7.4 and then filtered using a 0.22 micron polyether sulphone (PES) membrane filter.

Lenses having a PAA-LbL coating as described in Example 4 are placed in a polypropylene shell with 0.55 ml of the IPC saline (half of the saline is added prior to inserting the lens). The blister is then sealed with foil and autoclaved for about 30 minutes at about 121° C., forming a crosslinked (or hydrogel) coating on the lenses.

The resultant lenses pass debris adhesion test (rating of 0). The lenses have a WBUT of longer than 10 seconds. The lenses are more lubricious than Air Optix™ lenses based on qualitative finger rubbing tests (lubricity rating of 3).

Example 9

Aquacat PF618 is a commercially available 10% aqueous solution of Cationic Guar Gum manufactured by Aqualon division of Hercules, Inc. An IPC solution is prepared by adding 1 wt % 4-arm polyethylene glycol epoxides (4-arm PEG-epoxide) along with 0.01 wt % of Aquacat PF618 to phosphate buffered saline (PBS prepared as described in Example 4). The final pH is adjusted to 11.5. The solution is then heat treated at 40° C. for 3 hours. After the heat treatment, the pH of the solution is adjusted to 7.2~7.4 and then filtered using a 0.22 micron polyether sulphone (PES) membrane filter.

Lenses having a PAA-LbL coating as described in Example 4 are placed in a polypropylene shell with 0.55 ml of the IPC saline (half of the saline is added prior to inserting the lens). The blister is then sealed with foil and autoclaved for about 30 minutes at about 121° C., forming a crosslinked (or hydrogel) coating on the lenses.

The test lenses pass debris adhesion test (rating of 1). The lenses have a WBUT of longer than 10 seconds. The lenses are extremely lubricious based on qualitative finger rubbing tests (lubricity rating of 0).

Example 10

Kollicoat® (Polyvinyl alcohol-polyethylene glycol graft-copolymer) is purchased from Sigma Life sciences and used as received. An IPC saline is prepared by adding 5% of 4-arm polyethylene glycol epoxides (4-arm PEG-epoxide) and 0.05% Kollicoat to the phosphate buffered saline (PBS) and adjusting the pH to 7.2~7.4.

Lenses having a PAA-LbL coating as described in Example 4 are placed in a polypropylene shell with 0.55 ml of the IPC saline (half of the saline is added prior to inserting the lens). The blister is then sealed with foil and autoclaved for about 30 minutes at about 121° C., forming a crosslinked coating on the lenses.

The resultant lenses pass debris adhesion test (rating of 0). The lenses have a WBUT of 7 seconds. The lenses are more lubricious than Air Optix™ lenses based on qualitative finger rubbing tests (lubricity rating of 3).

Example 11

Methoxy-poly(ethylene glycol)-thiol, avg Mw2000 (product# mPEG-SH-2000, Laysan Bio Inc.) is purchased and used as received. An IPC saline is prepared by adding 5% of 4-arm polyethylene glycol epoxides (4-arm PEG-epoxide) and 1 wt % of mPEG-SH to the phosphate buffered saline (PBS) and adjusting the pH to 7.2~7.4.

Lenses having a PAA-LbL coating as described in Example 4 are placed in a polypropylene shell with 0.55 ml of the IPC saline (half of the saline is added prior to inserting the lens). The blister is then sealed with foil and autoclaved for about 30 minutes at about 121° C., forming a crosslinked (or hydrogel) coating on the lenses.

The resultant lenses shows improved resistance to debris adhesion (rating of 2) compared to a PAA-coated lens as control (rating of 4). The lenses have a WBUT of 7 seconds. The lenses are very lubricious based on qualitative finger rubbing tests (lubricity rating of 1).

What is claimed is:

1. A coated silicone hydrogel contact lens, comprising: a silicone hydrogel contact lens and a crosslinked hydrophilic coating thereon,
   wherein the crosslinked hydrophilic coating comprises a layer of a carboxyl-containing polymeric material on the surface of silicone hydrogel contact lens and a layer of a first hydrophilic polymeric material on top of the layer of the carboxyl-containing polymeric material,
   wherein the layer of the first hydrophilic polymeric material is crosslinked onto the layer of the carboxyl-containing polymeric material through linkages each formed between one carboxyl group and one epoxide group,
   wherein the first hydrophilic polymeric material is derived from a second hydrophilic polymeric material which comprises epoxide groups and is (i) a partial reaction product of a first multi-arm polyethyleneglycol having terminal epoxide groups and a first hydrophilicity-enhancing agent having at least one reactive functional group selected from the group consisting of amino group, carboxyl group, hydroxyl group, thiol group, and combination thereof, (ii) a second multi-arm polyethyleneglycol having terminal epoxide groups, (iii) a mixture of a third multi-arm polyethyleneglycol having terminal epoxide groups and a second hydrophilicity-enhancing agent having at least one reactive functional group selected from the group consisting of amino group, carboxyl group, hydroxyl group, thiol group, and combination thereof, or (iv) a combination thereof,
   wherein the coated silicone hydrogel contact lens has at least one of the properties selected from the group consisting of: an oxygen permeability of at least about 40 barrers; an elastic modulus of about 1.5 MPa or less; an Ionoflux Diffusion Coefficient, D, of, at least about $1.5 \times 10^{-6}$ mm$^2$/min; a water content of from about 18% to about 70% by weight when fully hydrated; or combinations thereof.

2. The coated silicone hydrogel contact lens of claim 1, wherein the second hydrophilic polymeric material is a partial reaction product of the first multi-arm polyethyleneglycol having terminal epoxide groups and the first hydrophilicity-enhancing agent having at least one reactive functional group selected from the group consisting of amino group, carboxyl group, hydroxyl group, thiol group, and combinations thereof.

3. The coated silicone hydrogel contact lens of claim 2, wherein the second hydrophilic polymeric material is obtained from a reactive composition comprising about 20% to about 95% by weight of the first multi-arm polyethyleneglycol having terminal epoxide groups and from about 5% to about 80% by weight of the first hydrophilicity-enhancing agent.

4. The coated silicone hydrogel contact lens of claim 3, wherein the first hydrophilicity-enhancing agent is selected from the group consisting of amino-containing monosaccharides; carboxyl-containing monosaccharides; thiol-containing monosaccharides; amino-containing disaccharides; carboxyl-containing disaccharides; thiol-containing disaccharides; amino-containing oligosaccharides; carboxyl-containing oligosaccharides; thiol-containing oligosaccharides; carboxymethylcellulose; carboxyethylcellulose; carboxypropylcellulose; hyaluronic acid; chondroitin sulfate; and combinations thereof.

5. The coated silicone hydrogel contact lens of claim 3, wherein the first hydrophilicity-enhancing agent is selected from the group consisting of PEG-NH$_2$; PEG-SH; PEG- COOH; H₂N-PEG-NH₂; HOOC-PEG-COOH; HS-PEG-SH; H₂N-PEG-COOH; HOOC-PEG-SH; H₂N-PEG-SH; multi-arm PEG with at least one amino group; multi-arm PEG with at least one carboxyl group; multi-arm PEG with at least one thiol group; PEG dendrimers with at least one amino group; PEG dendrimers with at least one carboxyl group; PEG dendrimers with at least one thiol group; a monoamino-, monocarboxyl-, diamino- or dicarboxyl-terminated homo- or copolymer of a non-reactive hydrophilic vinylic monomer selected from the group consisting of acrylamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30% by weight of (meth)acrylic acid, $C_2$-$C_{12}$ alkylacrylic acid, vinylamine, allylamine and/or amino-$C_2$-$C_4$ alkyl (meth)acrylate, and (2) (meth)acryloyloxyethyl phosphorylcholine and/or at least one non-reactive hydrophilic vinylic monomer selected from the group consisting of acrylamide, N,N-dimethylacrylamide, N-vinylpyrrolidone, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof.

6. The coated silicone hydrogel contact lens of claim 1, wherein the second hydrophilic polymeric material is a second multi-arm polyethyleneglycol having terminal epoxide groups.

7. The coated silicone hydrogel contact lens of claim 1, wherein the second hydrophilic polymeric material is a mixture of a third multi-arm polyethyleneglycol having terminal epoxide groups and a second hydrophilicity-enhancing agent having at least one reactive functional group selected from the group consisting of amino group, carboxyl group, hydroxyl group, thiol group, and combinations thereof.

8. The coated silicone hydrogel contact lens of claim 7, wherein the second hydrophilicity-enhancing agents is selected from the group consisting of amino-containing monosaccharides; carboxyl-containing monosaccharides; thiol-containing monosaccharides; amino-containing disaccharides; carboxyl-containing disaccharides; thiol-containing disaccharides; amino-containing oligosaccharides; carboxyl-containing oligosaccharides; thiol-containing oligosaccharides; carboxymethylcellulose; carboxyethylcellulose; carboxypropylcellulose; hyaluronic acid; chondroitin sulfate; and combinations thereof.

9. The coated silicone hydrogel contact lens of claim 7, wherein the second hydrophilicity-enhancing agents is a hydrophilic polymer having one or more amino, carboxyl and/or thiol groups.

10. The coated silicone hydrogel contact lens of claim 7, wherein the second hydrophilicity-enhancing agent is selected from the group consisting of PEG-NH₂; PEG-SH; PEG-COOH; H₂N-PEG-NH₂; HOOC-PEG-COOH; HS-PEG-SH; H₂N-PEG-COOH; HOOC-PEG-SH; H₂N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acrylamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30% by weight of (meth)acrylic acid, $C_2$-$C_{12}$ alkylacrylic acid, vinylamine, allylamine and/or amino-$C_2$-$C_4$ alkyl (meth)acrylate, and (2) (meth)acryloyloxyethyl phosphorylcholine and/or at least one non-reactive hydrophilic vinylic monomer selected from the group consisting of acrylamide, N,N-dimethylacrylamide, N-vinylpyrrolidone, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combinations thereof.

11. The coated silicone hydrogel contact lens of claim 1, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

12. The coated silicone hydrogel contact lens of claim 11, wherein the weight average molecular weight $M_w$ of the carboxyl-containing polymeric material is at least about 10,000 Daltons.

13. The coated silicone hydrogel contact lens of claim 3, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

14. The coated silicone hydrogel contact lens of claim 4, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

15. The coated silicone hydrogel contact lens of claim 5, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

16. The coated silicone hydrogel contact lens of claim 6, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

17. The coated silicone hydrogel contact lens of claim 7, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

18. The coated silicone hydrogel contact lens of claim 8, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

19. The coated silicone hydrogel contact lens of claim 9, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

20. The coated silicone hydrogel contact lens of claim 10, wherein the carboxyl-containing polymeric material is polyacrylic acid, polymethacrylic acid, poly($C_2$-$C_4$ alkylacrylic acid), poly[acrylic acid-co-methacrylic acid], poly(N,N-2-acrylamidoglycolic acid), poly[(meth)acrylic acid-co-acrylamide], poly[(meth)acrylic acid-co-vinylpyrrolidone], poly[$C_2$-$C_{12}$ alkylacrylic acid-co-acrylamide], poly[$C_2$-$C_4$ alkylacrylic acid-co-vinylpyrrolidone], hydrolyzed poly[(meth)acrylic acid-co-vinylacetate], hydrolyzed poly[$C_2$-$C_4$ alkylacrylic acid-co-vinylacetate], or combinations thereof.

\* \* \* \* \*